US011436060B2

(12) United States Patent
Rao et al.

(10) Patent No.: US 11,436,060 B2
(45) Date of Patent: Sep. 6, 2022

(54) PROACTIVE MANAGEMENT OF INTER-GPU NETWORK LINKS

(71) Applicant: Advanced Micro Devices, Inc., Santa Clara, CA (US)

(72) Inventors: Karthik Rao, Austin, TX (US); Abhinav Vishnu, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 420 days.

(21) Appl. No.: 16/552,065

(22) Filed: Aug. 27, 2019

(65) Prior Publication Data
US 2021/0064444 A1 Mar. 4, 2021

(51) Int. Cl.
*G06F 9/46* (2006.01)
*G06F 9/50* (2006.01)
*G06N 3/08* (2006.01)
*G06F 9/54* (2006.01)
*G06F 9/38* (2018.01)

(52) U.S. Cl.
CPC .......... *G06F 9/5094* (2013.01); *G06F 9/3877* (2013.01); *G06F 9/545* (2013.01); *G06N 3/08* (2013.01)

(58) Field of Classification Search
CPC ...... G06F 9/5094; G06F 9/3877; G06F 9/545; G06F 9/4893; G06F 9/5038; G06F 1/26; G06F 1/32; G06F 1/3203; G06F 1/3206; G06F 1/266; G06F 1/3209; G06F 1/3228; G06F 1/3278; G06F 1/3287; G06N 3/08; G06N 3/0454; G06N 3/063; G06N 3/084; Y02D 10/00
See application file for complete search history.

(56) References Cited

U.S. PATENT DOCUMENTS

| | | | | |
|---|---|---|---|---|
| 8,694,811 B2 * | 4/2014 | Raju | ..................... | G06F 1/3203 713/320 |
| 8,990,827 B2 * | 3/2015 | Wu | ..................... | G06F 16/2455 718/104 |
| 2009/0132844 A1 * | 5/2009 | Allarey | ................. | G06F 1/3203 713/340 |

(Continued)

OTHER PUBLICATIONS

Goyal et al., "Accurate, Large Minibatch SGD: Training ImageNet in 1 Hour", arXiv.org, Jun. 8, 2017, 12 pages.

*Primary Examiner* — Hiren P Patel
*Assistant Examiner* — Zhi Chen
(74) *Attorney, Agent, or Firm* — Kowert Hood Munyon Rankin and Goetzel PC; Rory D. Rankin

(57) ABSTRACT

Systems, apparatuses, and methods for proactively managing inter-processor network links are disclosed. A computing system includes at least a control unit and a plurality of processing units. Each processing unit of the plurality of processing units includes a compute module and a configurable link interface. The control unit dynamically adjusts a clock frequency and a link width of the configurable link interface of each processing unit based on a data transfer size and layer computation time of a plurality of layers of a neural network so as to reduce execution time of each layer. By adjusting the clock frequency and the link width of the link interface on a per-layer basis, the overlapping of communication and computation phases is closely matched, allowing layers to complete more quickly.

20 Claims, 11 Drawing Sheets

(56) References Cited

U.S. PATENT DOCUMENTS

| | | | |
|---|---|---|---|
| 2009/0164687 A1* | 6/2009 | Zhu | G06F 1/3203 |
| | | | 710/302 |
| 2009/0174570 A1* | 7/2009 | Hagg | G08C 17/02 |
| | | | 340/870.31 |
| 2012/0167149 A1* | 6/2012 | Toba | H04N 21/4402 |
| | | | 725/85 |
| 2012/0179922 A1* | 7/2012 | Mehrotra | G06F 1/3278 |
| | | | 713/300 |
| 2016/0062447 A1* | 3/2016 | Hsu | G06F 1/3243 |
| | | | 713/300 |
| 2017/0228155 A1* | 8/2017 | Shirota | G06F 3/061 |
| 2018/0293492 A1* | 10/2018 | Kalamkar | G06N 3/063 |
| 2019/0246353 A1* | 8/2019 | Jensen | H04L 67/325 |
| 2020/0050920 A1* | 2/2020 | Idgunji | G06F 1/329 |

* cited by examiner

| Power Combination Setting | Portion of Available Power Provided to the Network Communication Link | Portion of Available Power Provided to the Compute Units | Estimate of Time Required to Complete Data Transfer Using Allocated Power | Estimate of Time Required to Complete Kernel Using Allocated Power | Lag Between Overlap of Data Transfer and Kernel | Estimate of Time Required to Complete the Layer |
|---|---|---|---|---|---|---|
| 505A | 90% | 10% | 42 ms | 78 ms | 15 ms | 93 ms |
| 505B | 80% | 20% | 46 ms | 70 ms | 15 ms | 85 ms |
| 505C | 70% | 30% | 52 ms | 61 ms | 15 ms | 76 ms |
| 505D | 60% | 40% | 56 ms | 59 ms | 15 ms | 74 ms |
| 505E | 50% | 50% | 64 ms | 57 ms | 15 ms | 72 ms |
| 505F | 40% | 60% | 73 ms | 54 ms | 15 ms | 73 ms |
| 505G | 30% | 70% | 76 ms | 50 ms | 15 ms | 76 ms |
| 505H | 20% | 80% | 83 ms | 47 ms | 15 ms | 83 ms |
| 505J | 10% | 90% | 90 ms | 43 ms | 15 ms | 90 ms |

Optimal Setting (505E)

$$Time\ for\ Transfer = \frac{Msg\ Size\ in\ Bytes}{\#\ of\ lanes\ per\ link} * f * \frac{P}{P-1}$$

PROACTIVE MANAGEMENT OF INTER-GPU NETWORK LINKS

BACKGROUND

Description of the Related Art

An emerging technology field is machine learning, with a neural network being one type of a machine learning model. Neural networks have demonstrated excellent performance at tasks such as hand-written digit classification and face detection. Additionally, neural networks have also shown promise for performing well in other, more challenging, visual classification tasks. Other applications for neural networks include speech recognition, language modeling, sentiment analysis, text prediction, and others.

Neural network training is frequently performed on computing systems with multiple processing units (e.g., graphics processing units (GPUs)). Even in systems with many processing units, it can take several days to train the neural network. Regardless of how the training is partitioned (e.g., model partitioning, training data partitioning), data such as weight updates (i.e., gradients) are exchanged between the individual processing units. This transfer of data is bursty in nature. If the network clock frequencies are permanently fixed at the maximum value to achieve the shortest possible transfer of data, the link interface consumes a significant amount of power and leaves the compute units starving for power.

BRIEF DESCRIPTION OF THE DRAWINGS

The advantages of the methods and mechanisms described herein may be better understood by referring to the following description in conjunction with the accompanying drawings, in which:

FIG. 5 illustrates a table for selecting an optimal communication-compute power sharing setting in accordance with one implementation.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing proactive management of inter-processor network links are disclosed herein. In one implementation, a computing system includes at least a control unit and a plurality of processing units. In one implementation, the plurality of processing units are arranged together in a ring topology. In other implementations, the plurality of processing units are connected in other arrangements. Each processing unit of the plurality of processing units comprises a compute module and a configurable link interface. The control unit dynamically adjusts a clock frequency and/or link width of the configurable link interface of each processing unit based on a data transfer size and layer computation time (i.e., kernel runtime) of a plurality of layers of a neural network so as to reduce execution time of each layer.

Figure 1:
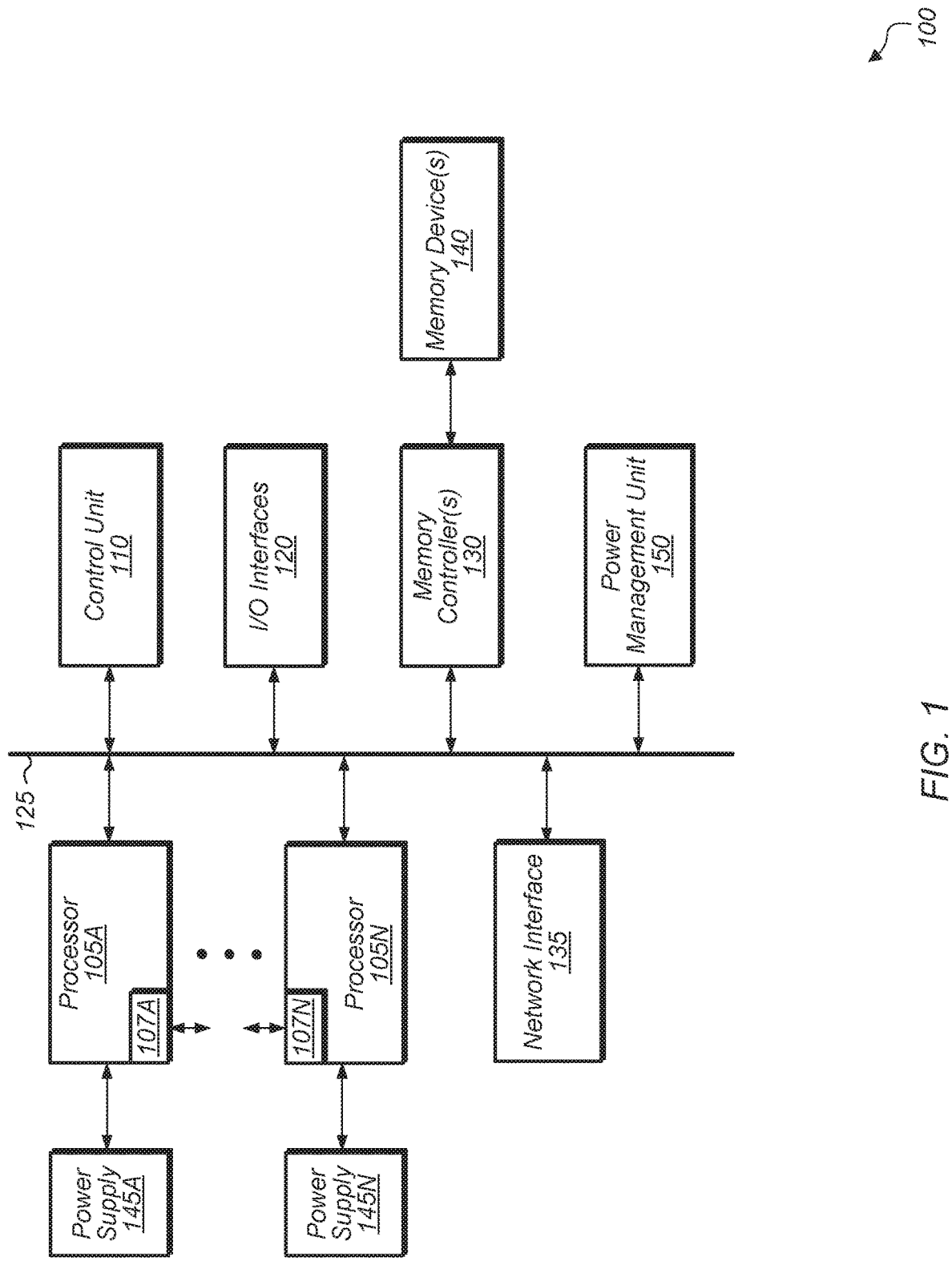
FIG. 1 is a block diagram of one implementation of a computing system.

Referring now to FIG. 1, a block diagram of one implementation of a computing system 100 is shown. In one implementation, computing system 100 includes at least processors 105A-N, control unit 110, input/output (I/O) interfaces 120, bus 125, memory controller(s) 130, network interface 135, memory device(s) 140, power supply 145, and power management unit 150. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processors 105A-N include a plurality of GPUs, connected together via link interfaces 107A-N, with the specific type (e.g., global memory interconnect (GMI), external GMI (xGMI), peripheral component interconnect express (PCIe)) of link interface used for link interfaces 107A-N varying according to the implementation. In one implementation, the GPUs are training a neural network, with each individual GPU drawing power from a separate power supply 145A-N. In various implementations, the plurality of GPUs are included on a single circuit card, are located on multiple circuit cards within a common enclosure, or otherwise. In these implementations, each power supply 145A-N is limited in the amount of power it can deliver to an individual GPU. For example, in one implementation, an individual power supply 145A-N is able to supply 250 Watts (W), which means that all of the calculations and data transmissions performed by a GPU have to be achieved within a 250 W budget. In other implementations, each individual power supply 145A-N can supply other amounts of power. To ensure optimal performance while training a neural network, the link width and clock frequency of link interfaces 107A-N is dynamically adjusted to coincide with the transfer of data (e.g., weight updates) between processors 105A-N.

Depending on the implementation, different types of neural networks can be trained on processors 105A-N. For example, in one implementation, a neural network is trained to analyze a video frame to generate one or more label probabilities for the video frame. For example, potential use cases include at least eye tracking, object recognition, point cloud estimation, ray tracing, light field modeling, depth tracking, and others. For eye tracking use cases, probabilities generated by the trained neural network are based on learned patterns, dwell, transition angles, blink, etc. In other implementations, the neural network is customized for other types of use cases. For example, in these implementations, the neural network is customized for speech recognition, language modeling, sentiment analysis, text prediction, and/or other applications.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, media recording devices, external storage devices, network interface cards, and so forth. Network interface 135 is used to receive and send network messages across a network. Bus 125 is representative of any type of bus or fabric with any number of links for connecting together the different components of system 100.

In one implementation, power management unit 150 monitors and/or controls various power-performance states of components within system 100. Responsive to detecting various events, the power management unit 150 causes other components within system 100 to either increase or decrease their current power-performance state. In various implementations, changing a power-performance state includes changing a current operating frequency of a device and/or changing a current voltage level of a device. In one implementation, if a power limit for power supply 145 is reached and/or exceeded, power management unit 150 reduces the power-performance states of processors 105A-N. When the power-performance states of processors 105A-N are reduced, this causes the computing tasks being executed by processors 105A-N to take longer to complete. Alternatively, when there is sufficient room to increase the power-performance states of processors 105A-N, this causes the computing tasks being executed by processors 105A-N to take less time to complete.

The power limit for power supply 145 can be exceeded when a plurality of processors 105A-N are training a neural network overlaps with the execution of compute kernels and the transfer of data over link interface units 107A-N. In one implementation, to prevent the power limit for power supply 145 from being exceeded, or to minimize the amount of time that the power limit for power supply 145 is exceeded, link interface units 107A-N are dynamically adjusted to coincide to the periods of time when data is being transferred between processors 105A-N during training of a neural network. When data is not being transferred, the power supplied to link interface units 107A-N is reduced, allowing more power to be consumed by the compute units of processors 105A-N. It is noted that the power supplied to link interface units 107A-N is reduced in a proactive manner (i.e., prior to detecting a reduction in bandwidth on the link). It is noted that as used herein, the term "proactive" is defined as changing a power combination setting prior to detecting a change in bandwidth on the link. The dynamic adjustment of link interface units 107A-N also decreases the amount of time processors 105A-N are required to operate in a reduced power-performance state. As a result, processors 105A-N are able to complete their tasks in a faster, more efficient manner. In various implementations, processors 105A-N and/or control unit 110 are responsible for dynamically adjusting the link interface units 107A-N. Control unit 110 is implemented using any suitable combination of hardware and/or software. In one implementation, control unit 110 is implemented as software executing on one or more of processors 105A-N.

In various implementations, computing system 100 is a computer, laptop, mobile device, server, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1 and/or one or more of the components shown in computing system 100 are omitted. Additionally, in other implementations, computing system 100 is structured in other ways than shown in FIG. 1.

Figure 2:
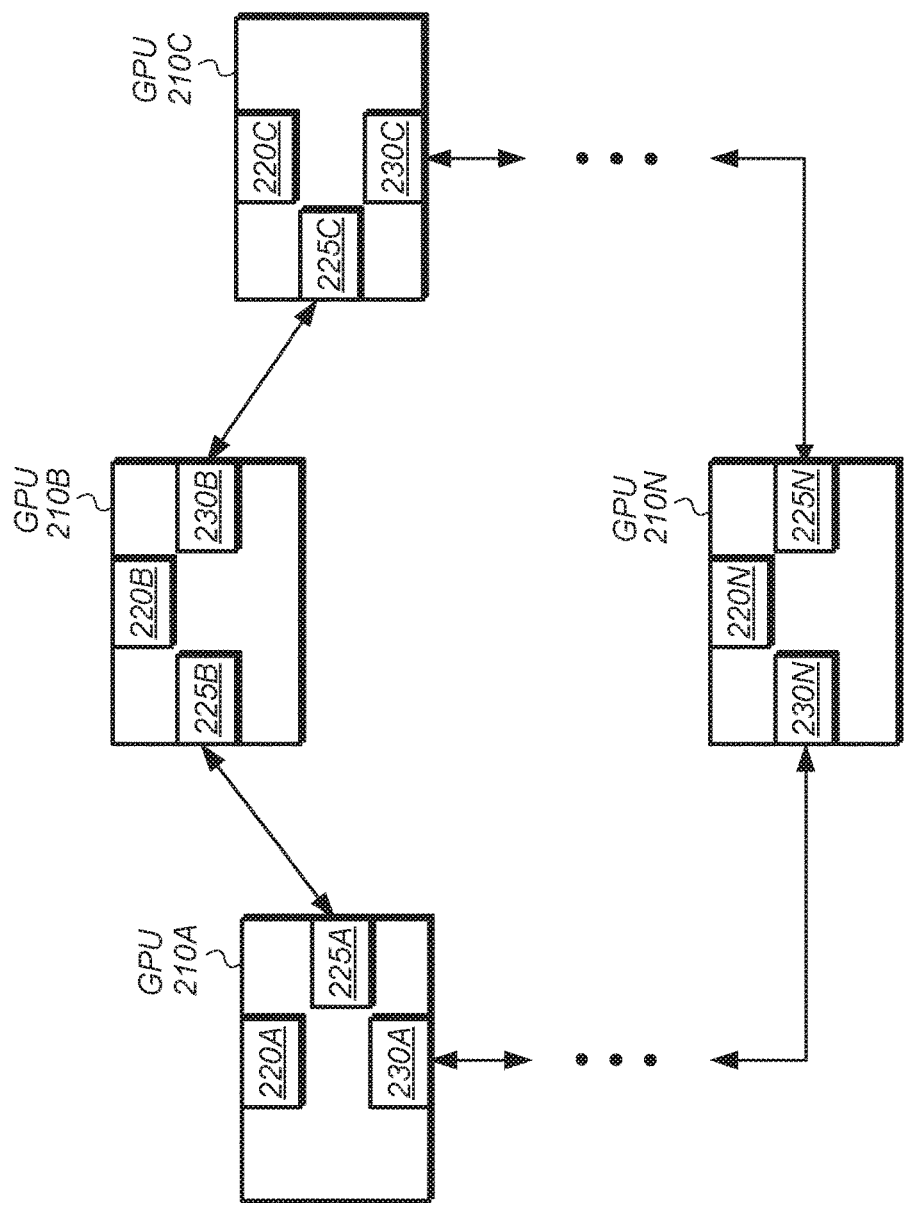
FIG. 2 is a block diagram of another implementation of a computing system.

Turning now to FIG. 2, a block diagram of another implementation of a computing system 200 is shown. In one implementation, computing system 200 includes a plurality of GPUs 210A-N connected together in a ring topology. In other implementations, GPUs 210A-N are connected together using any of various other suitable topologies. GPUs 210A-N are representative of any number of GPUs that are included in system 200, with the number varying from implementation to implementation. Additionally, in other implementations, system 200 can include other types of processing units, such as FPGAs, ASICs, DSPs, or any combination thereof, arranged in a ring topology.

In one implementation, each GPU 210A-N includes a corresponding compute module 220A-N and corresponding link interface units 225A-N and 230A-N. In one implementation, each compute module 220A-N includes a plurality of compute units, with each compute unit including a group of arithmetic logic units (ALUs) for performing data computations in parallel. While each GPU 210A-N is shown as having two link interface units 225A-N and 230A-N, it should be understood that this is merely representative of one implementation. In another implementation, each GPU 210A-N has only a single link interface unit. Alternatively, in a further implementation, each GPU 210A-N can have more than two link interface units.

In one implementation, GPUs 210A-N work together to train a neural network. In various implementations, GPUs 210A-N exchange information (e.g., weight updates) during the training of each layer of the neural network. The various layers of the neural network can include convolutional layers, activation layers, pooling layers, fully-connected layers, and other types of layers. Each GPU 210A-N includes corresponding link interface units 225A-N and 230A-N for communicating with the other GPUs. The power states of link interface units 225A-N and 230A-N are dynamically adjusted to optimize the throughput of data being transmitted over the links between GPUs 210A-N. For example, the width of each link interface unit 225A-N and 230A-N is able to be adjusted to increase or decrease the number of lanes over which data is sent. Also, the clock frequency at which data is sent over the links is also able to be adjusted. When GPUs 210A-N are executing kernels on their compute units 220A-N, respectively, during a compute phase and no data is being transmitted to the other GPUs, the link interface unit 225A-N and 230A-N are reduced to a relatively low operating state. The relatively low power-performance state has a relatively low number of active lanes and a relatively low clock frequency. For example, during the forward pass of neural network training, the link interface units 225A-N and 230A-N operate in the relatively low operating state. In some cases, the relatively low operating state is a sleep state or a powered off state.

Once data (e.g., weight updates) needs to be transmitted during the backward pass, the link interface units 225A-N and 230A-N are transitioned into a relatively high operating state. This relatively high operating state has a relatively high number of active lanes and a relatively high clock frequency. For example, in one implementation, the relatively high operating state has corresponds to the maximum possible number of active lanes and the maximum possible clock frequency. In another implementation, the operating state is chosen to balance the amount of power that is shared between link interface units 225A-N and 230A-N and compute units 220A-N to minimize the time required for completing a given layer of the neural network.

Figure 3:
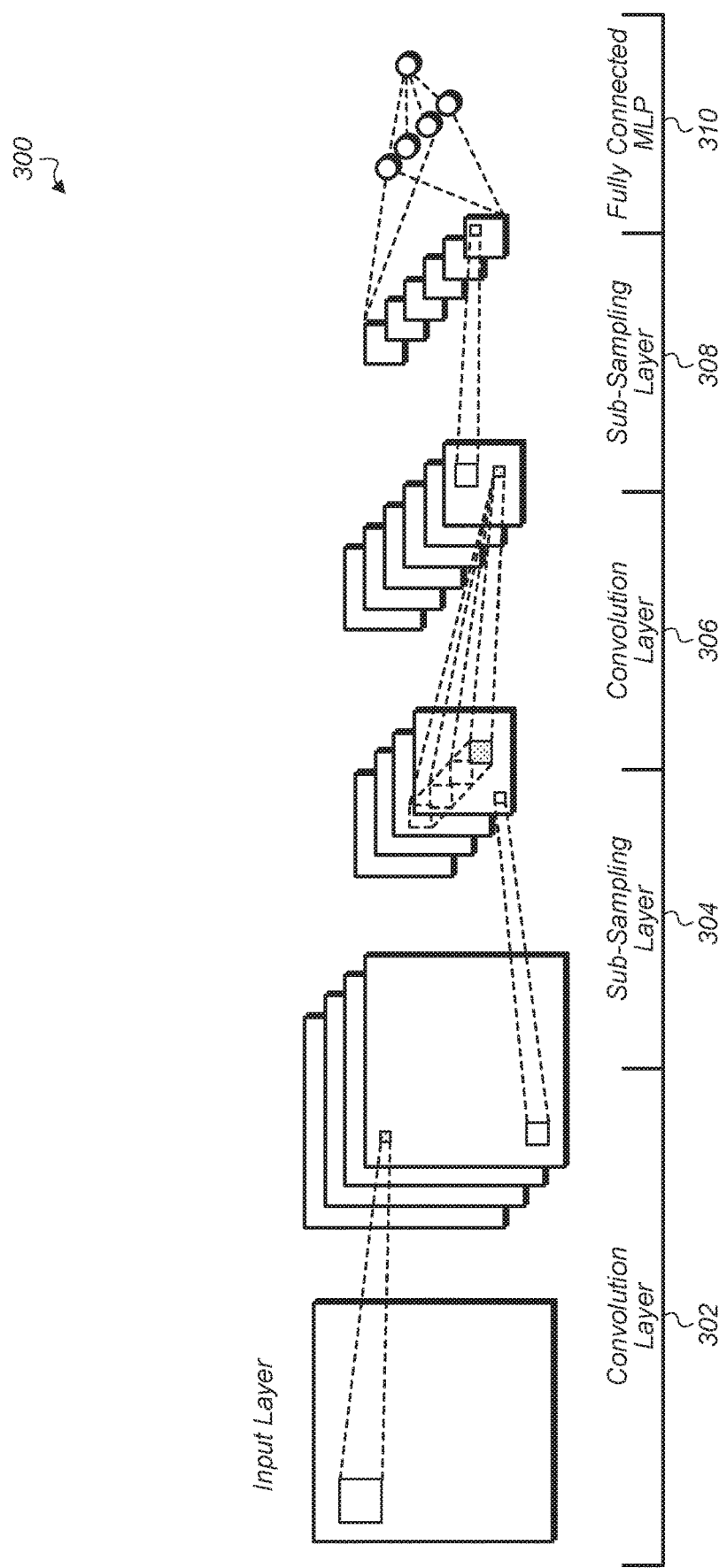
FIG. 3 is a block diagram of one implementation of a neural network.

Turning now to FIG. 3, a block diagram of one implementation of a neural network 300 is shown. Neural network 300 includes convolution layer 302, sub-sampling layer 304, convolution layer 306, sub-sampling layer 308, and fully connected multilayer perceptron (MLP) 310. The specific configuration of neural network 300 is intended to provide one example of a neural network in accordance with one implementation. In other implementations, neural network 300 can include other numbers of layers and/or other arrangements of layers.

When training neural network 300 on a computing system (e.g., system 100 of FIG. 1), the power consumption requirements and time needed to complete training can be substantial. During supervised training, neural network 300 is given inputs that have already been classified. Based on the inputs, the layers of the neural network 300 generate activations that propagate from one layer to the next. This is called forward propagation. At the end of a forward propagation iteration, the neural network 300 makes a prediction about the input and how it should be classified. The prediction of neural network 300 is then compared with the already known, correct classification decision. If the prediction differs from the correct outcome, an error is calculated and propagated from the last layer of the neural network 300 back to the first layer in the form of gradients. The gradients in turn are used to update the weights of the layers. This process is called backward propagation and this type of training is based on the gradient descent algorithm. With each forward-backward propagation iteration, each layer updates its weights to improve the overall accuracy of the neural network 300.

When training neural network 300 on a computing system with multiple processing units (e.g., GPUs), the processing units are responsible for both executing compute kernels and transmitting weight updates to the other processing units during the backward propagation pass. The power available to each processing unit is shared between the compute units which are executing the compute kernels and the link interface units which are transmitting weight updates to the other processing units. Determining how to share the power between the compute units and the link interface units is a challenging issue.

Accordingly, in one implementation, power is shared with the goal of minimizing the amount of time required for the execution of each layer during the backward pass. To minimize the amount of time required for execution of the layer, the compute units are provided with maximum power during the phase when the link interface unit is inactive. Once the communication of weight updates begins, the link interface unit is provided with additional power to balance the need for the compute kernels to continue executing while also communicating weight updates to the other processing units. Techniques for determining how much additional power to provide to the link interface unit during the overlap phase are described in the remainder of this document.

Figure 4:
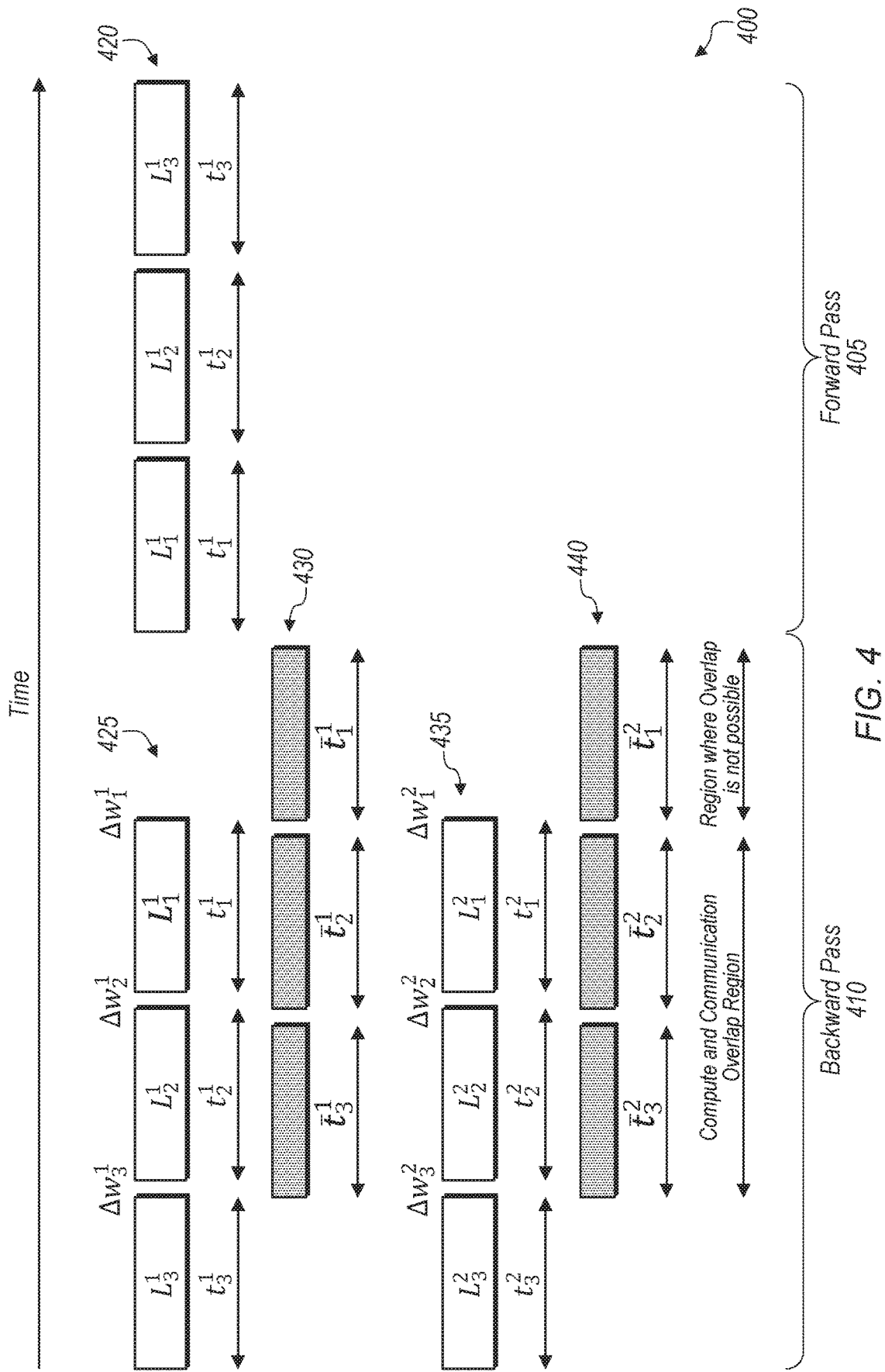
FIG. 4 illustrates a timing diagram of the phases of neural network training in accordance with one implementation.

Turning now to FIG. 4, a timing diagram 400 of the phases of neural network training in accordance with one implementation is shown. For timing diagram 400, a neural network with three layers is being trained. It should be understood that the neural network having three layers is shown merely for ease of illustration and to avoid cluttering the figure. In other implementations, the neural network can have other numbers of layers. The forward pass 405 of neural network training is shown on the right side of timing diagram 400, and the backward pass 410 of neural network training is shown on the left side of timing diagram 400. The timing blocks 420 which are representative of the computation phases for the forward pass 405 are shown on the top right of timing diagram 400. During the forward pass 405, there is no communication phase and hence no overlap of computation and communication. However, during the backward pass 410, there will be an overlap between computation and communication.

For timing diagram 400, the letter "L" represents to the layer kernel computation, the letter "t" represents the time duration of the computation phase, the letter "t bar" represents the time duration of the communication phase, and the letter "w" represents the network weight updates. Also, the labeling of the various letters shown for backward pass 410 is used to indicate the phase and GPU to which each block corresponds. For example, the superscript for each letter indicates the GPU number while the subscript for each letter indicates the layer number. Additionally, the clear blocks represent kernel computation phases while the shaded blocks represent communication phases. For example, blocks 420 represent the kernel computation phases for GPU1 for layers 1-3 during the forward pass 405, blocks 425 represent the kernel computation phases for GPU1 for layers 1-3 during the backward pass 410, blocks 430 represent the communication phases for GPU1 for layers 1-3, blocks 435 represent the kernel computation phases for GPU2 for layers 1-3 during the backward pass 410, and blocks 440 represent the communication phases for GPU2 for layers 1-3.

In one implementation, the goal of the computing system is to minimize the total amount of time required for the overlap of the kernel computation phase and the communication phase during the layers of the backward pass 410. This goal can be achieved by balancing the power that is provided to the compute units and the link interface units. If too much power is provided to the compute units, the compute kernels finish relatively quickly but the communication phase will be delayed. If too much power is provided to the link interface units, the communication phase finishes relatively quickly but the execution of the compute kernels will be delayed. Accordingly, the amount of power that is provided to the compute kernels and the link interface units should be split in such a way that it allows the compute kernels and communication phase to be completed in a time efficient manner.

One technique for determining how to balance power between the compute units and the link interface units involves estimating the amount of time that the kernel computation phase and the communication phase will take for a variety of different power sharing settings. Since the amount of data that needs to be sent between processing units can be determined, the time needed for sending the data can also be determined for different lane widths and clock frequency settings. Also, the time needed for completing the compute kernel can be determined for different power settings. In one implementation, a table of possible power sharing schemes is created to compare the timing of the overlap phase for the different schemes. After comparing the duration of the overlap phase for the different schemes, the optimal power sharing scheme with the shortest overlap phase is selected from the table. This scheme is then applied to the power settings for the processing units during the backward pass of neural network training. One example of such a table is shown in FIG. 5 and described further below.

Referring now to FIG. 5, a table 500 for selecting an optimal communication-compute power sharing setting in accordance with one implementation is shown. In one implementation, control logic (e.g., control unit 110 of FIG. 1) generates table 500 with entries specifying different possible power sharing arrangements that are being evaluated for potential selection. The number of entries in table 500 can vary according to the implementation. Each separate entry corresponds to a different possible power combination setting 505A-J for the network communication link and the compute units of the processing units of the computing system. The specific portions of available power provided to the network communication link are shown in column 510 for the different settings 505A-J, and the specific portions of available power provided to the compute units to complete the computation kernel are shown in column 515. It is noted that the control logic can generate table 500 for each separate layer of the neural network for the backward pass portion of training. Each layer of the neural network will execute a different kernel and have a different amount of data to transfer. This will result in the values in columns 520 and 525 varying for each separate layer. Accordingly, each layer can have a different table 500 and a different optimal power combination setting.

When giving a certain percentage of the total power budget to the network communication link, the control logic determines to which specific power state (e.g., link width and clock frequency settings) this specific percentage will map. Then, the control logic generates an estimate of time required to complete the data transfer using the link width and clock frequency which correspond to this percentage of the total power budget. In one implementation, the control logic uses formula 540 to calculate an estimate of the amount of time that it will take for the data to be sent over the network communication link. The control logic either has a priori knowledge of the message size in bytes that will be sent over the link, or the control logic is able to obtain the message size from software or from another processing unit. The control logic also determines the number of active lanes in the link and the clock frequency of the link based on the percentage of the total power budget being supplied to the network communication link. Additionally, the control logic obtains the number "P" of processing units in the ring topology of the computing system. Using these variables, the control logic generates an estimate of the time for transfer for each entry of table 500. These estimates are stored in column 520 of the entries for the specific power combination settings 505A-J.

The control logic also generates estimates of the amount of time it will take for the compute units to complete execution of the kernel based on the amount of power being provided to the compute units. In one implementation, for a machine learning kernel, generating the estimates is straightforward. For example, the estimates can be generated based on a formula (e.g., formula 540). Other techniques for generating the estimates are well known by those skilled in the art. These estimates are stored in column 525 of the entries for the specific power combination settings 505A-J. At the start of a layer, the compute units will be executing a compute kernel but the communication link will not be communicating data for some period of time until the weight updates start getting generated by the compute kernel. This period of time at the start of the layer while the communication link is active but execution of the compute kernel has not yet started is referred to as the lag and an example lag value is stored in column 530. While the compute units are idle at the start of the layer, the communication link will be supplied with all of the available power. Once the compute units become active, the power will be split between the compute units and the communication link according to the chosen power combination setting 505A-J.

To generate the estimate of the total time for the layer to be completed shown in column 535, the control logic adds the lag of 15 milliseconds (ms) from column 530 to the estimate of time to complete the compute kernel in column 525. Then, the control logic chooses the greater of this sum (15 ms added to the estimate in column 525) or the time in column 520. This value is representative of the total time for the layer to be completed and is shown in column 535. The control logic performs this calculation for all of the power combination settings 505A-J. Then, the control logic selects the power combination setting 505A-J with the lowest total amount of time number from column 535. In the example illustrated by table 500, the lowest total amount of time is 72 ms for power combination setting 505E. For power combination setting 505E, the network communication link receives 50% of the available power and the compute units receive 50% of the available power. Accordingly, during training of this particular neural network layer, the control unit applies these power settings to the network communication link and the compute units after the initial lag of 15 ms.

Figure 6:
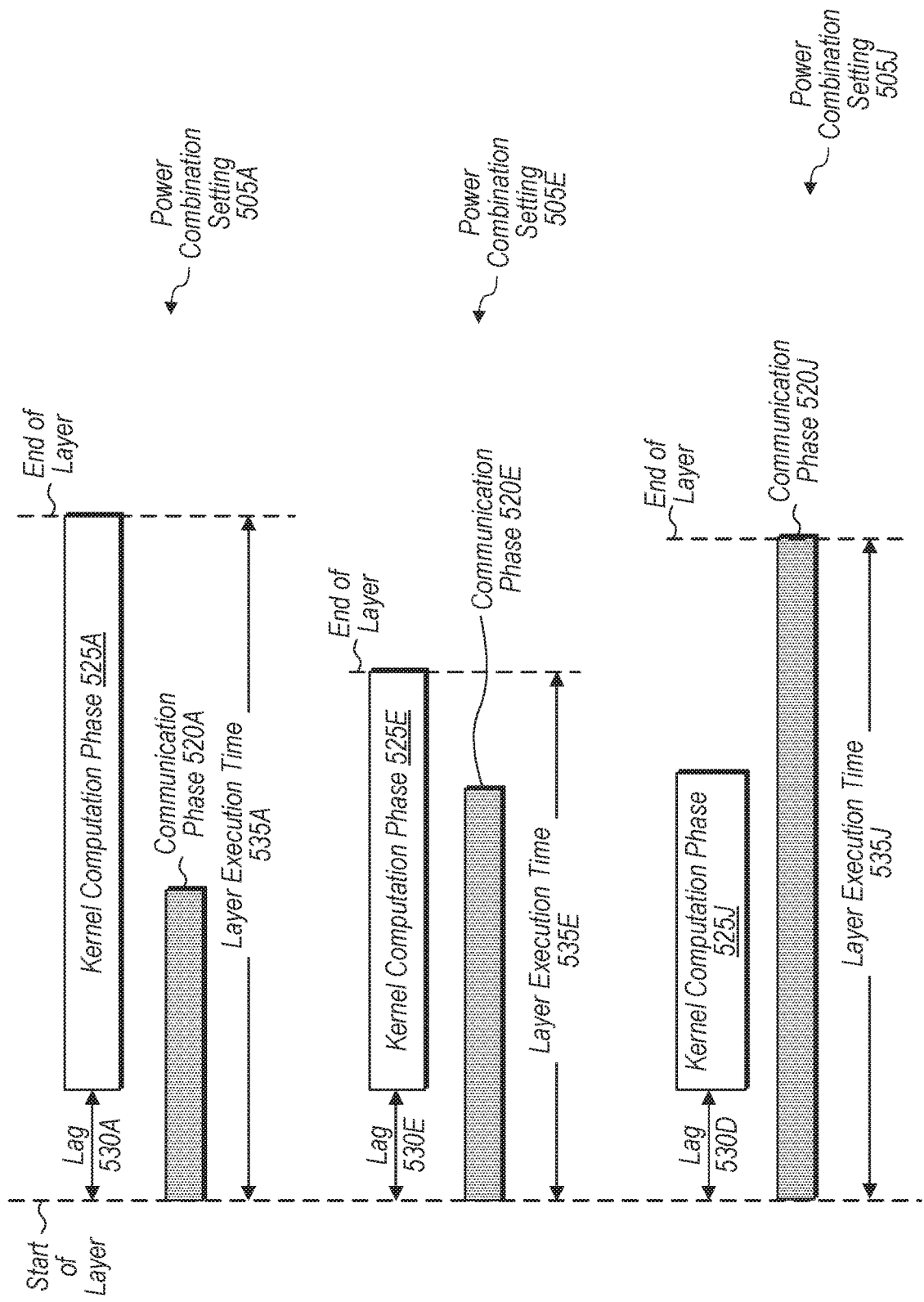
FIG. 6 illustrates a timing diagram of phases for three possible power combination settings in accordance with one implementation.

Turning now to FIG. 6, one implementation of a timing diagram of phases for three possible power combination settings is shown. The discussion of FIG. 6 is intended to be a continuation of the discussion of table 500 of FIG. 5. As shown in FIG. 6, the timing of three different possible scenarios for three different power combination settings is shown to illustrate how adjusting the power between the compute units and the network communication link can affect the timing of phases for a given neural network layer. The dashed line on the left side of FIG. 6 is intended to represent the start of a layer and the dashed line on the right side of each separate power combination setting is intended to represent the point in time when all phases of the layer will be completed.

The timing of phases for power combination setting 505A is shown at the top of FIG. 6. For power combination setting 505A, 90% of the available power is being provided to the network communication link while 10% of the available power is being provided to the compute units during the time when the phases overlap. At the beginning of the layer, when the compute kernel is not being executed while the weight updates are being transmitted, the compute units are in a sleep or low-power state while the network communication link is powered at the maximum possible power setting for the current operating conditions of the computing system. This period of time when the data transfer has started but the compute units are idle is shown as lag 530A. During lag 530A, the network communication link will typically be at its highest power setting. However, if the host processing unit has exceeded a thermal limit, the network communication link will not be powered at its highest power setting, but will be supplied with whatever amount of power is available during this time period.

Since the compute units are getting only 10% of the available power during the overlap of phases, kernel computation phase 525A is relatively long. Accordingly, the layer execution time 535A is equal to the amount of time needing for finishing kernel computation phase 525A. Communication phase 520A finishes relatively early due to 90% of the available power being supplied to the network communication link. It is noted that this 90% of available power is translated into a specific power state for the network communication link, with the specific power state having a particular number of active lanes and a particular clock frequency setting. For example, in one implementation, 90% of available power could translate to the maximum number of lanes and the second highest possible clock frequency setting for the link. Alternatively, in another implementation, 90% of available power could translate to the maximum number of lanes and the highest possible clock frequency setting for the link. The specific technique that is used for mapping a percentage of available power to a particular power state for the link can vary according to the implementation.

The timing of phases for power combination setting 505E is shown in the middle of FIG. 6. Power combination setting 505E is the optimal setting from all of the possible power combination settings 505A-J listed in table 500 since the layer execution time 535E is less than all of the other layer execution times for the other settings. This is due to the power being well balanced between the compute units and the network communication link such that the communication phase 520E finishes shortly before the computation phase 525E finishes. This is illustrated in the middle timing diagram where after accounting for lag 530E, the communication phase 520E overlaps for most of the remainder of kernel computation phase 525E.

The timing of phases for power combination setting 505J is shown at the bottom of FIG. 5 as an example of giving too much power to the compute units to the detriment of the network communication link. After lag 530J, the kernel computation phase 525J finishes relatively quickly due to having most of the power supplied to the compute units. However, the communication phase 520J takes much longer to complete since the network communication link is getting a small portion of the available power. This causes the layer execution time 535J to stretch out and be much longer than the layer execution time 535D for power combination setting 505J. It should be understood that the timing diagrams shown in FIG. 6 are indicative of one particular implementation of a given layer of a neural network. The timing for other implementations and/or for other layers of the neural network can vary from what is shown in FIG. 6.

Figure 7:
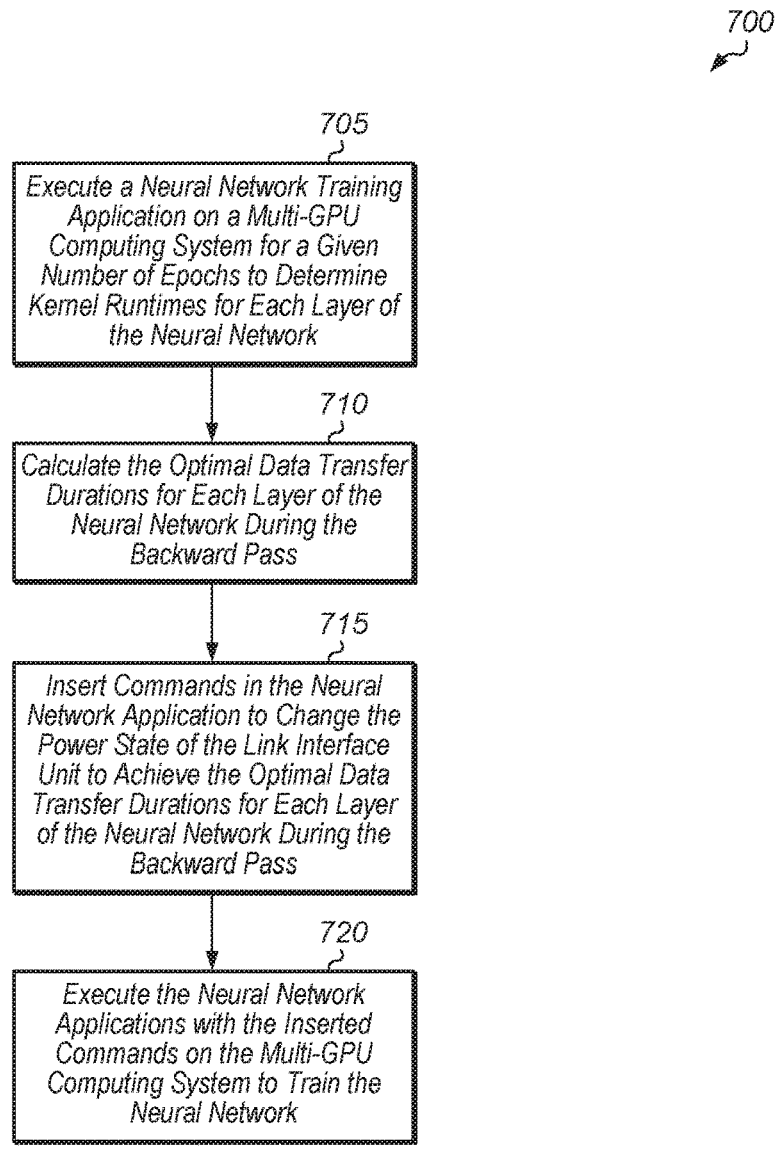
FIG. 7 is a generalized flow diagram illustrating one implementation of a method for dynamically adjusting network link settings in a proactive manner to achieve optimal performance.
Figure 8:
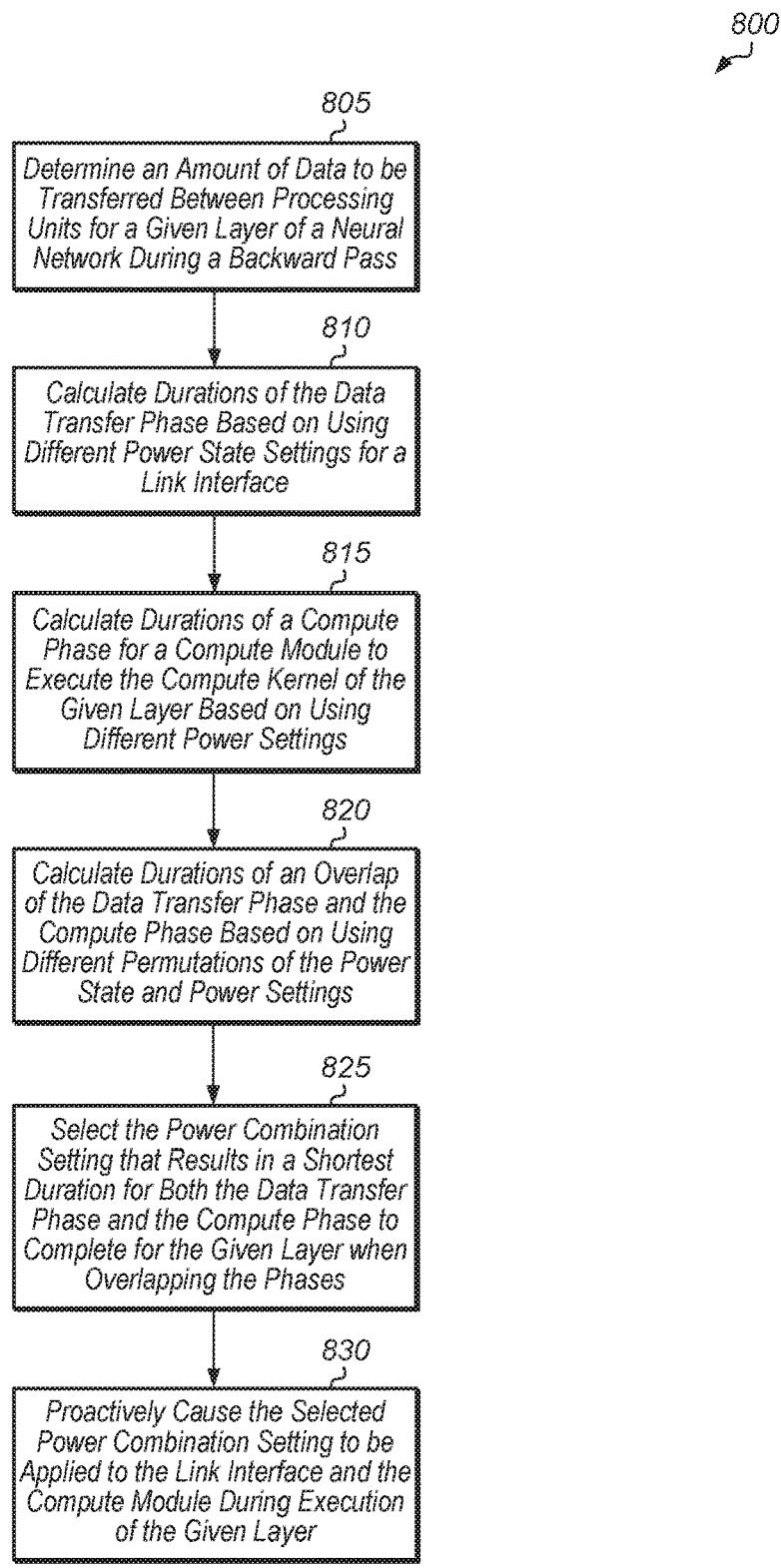
FIG. 8 is a generalized flow diagram illustrating another implementation of a method for choosing optimal power combination settings for processing units training a neural network.
Figure 9:
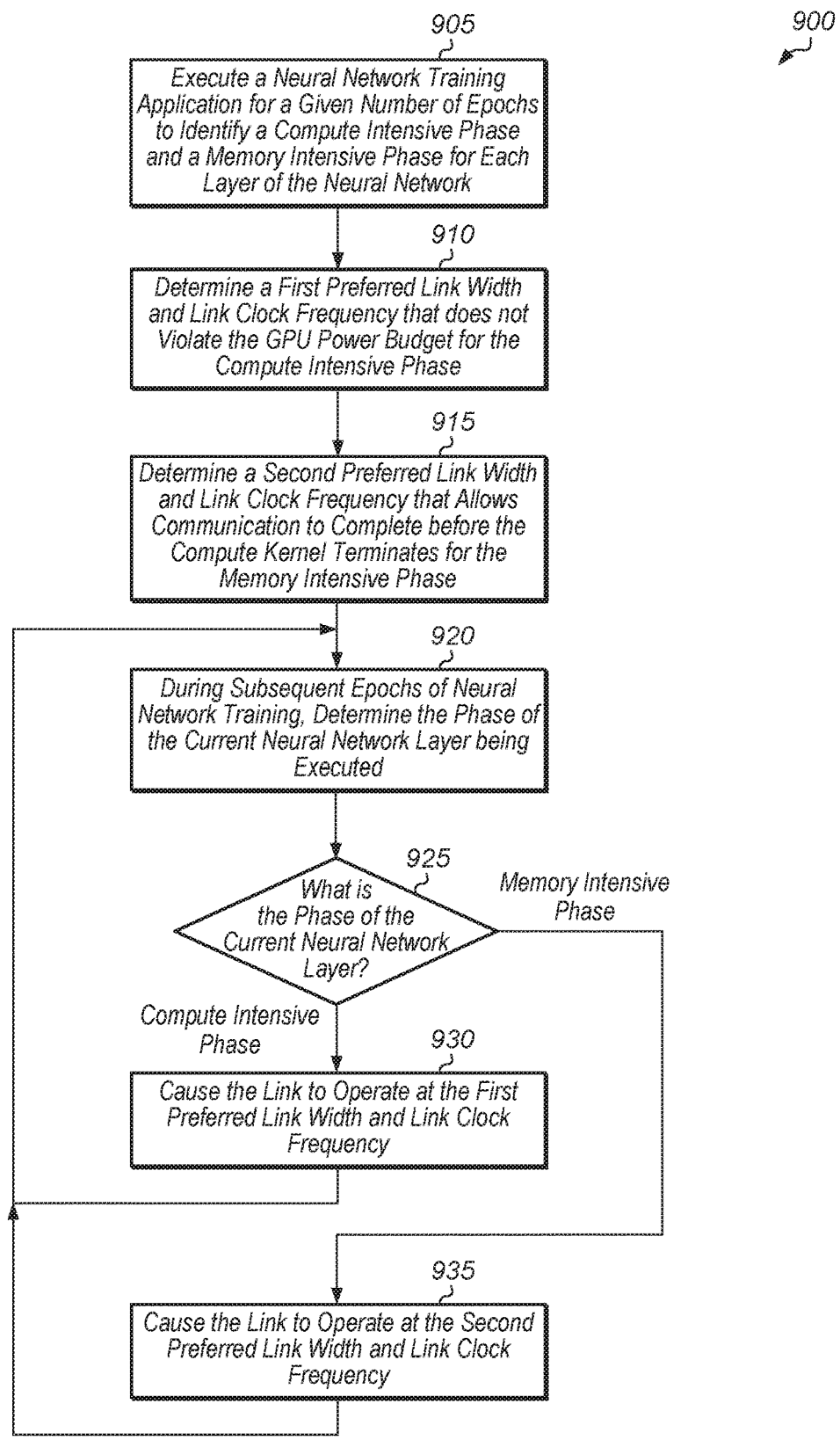
FIG. 9 is a generalized flow diagram illustrating one implementation of a method for dynamically sharing power between components in a multi-GPU computing system performing neural network training.

Referring now to FIG. 7, one implementation of a method 700 for dynamically adjusting network link settings in a proactive manner to achieve optimal performance is shown. For purposes of discussion, the steps in this implementation and those of FIG. 8-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein implement method 700.

A neural network training application is executed on a multi-GPU computing system for a given number of epochs to determine kernel runtimes for each layer of the neural network (block 705). As used herein, an "epoch" is defined as a single iteration of a neural network application being trained for a dataset which is passed forward and backward through the neural network. The number of epochs in the given number of epochs that are executed so as to determine the kernel runtimes can vary according to the implementation. Next, a control unit (e.g., control unit 110 of FIG. 1) calculates, based on the kernel runtimes, the optimal data transfer durations for each layer of the neural network during the backward pass (block 710). For example, in one implementation, the control unit generates a table (e.g., table 500 of FIG. 5) to determine the optimal data transfer duration that will cause the total layer execution time to be minimized. In one implementation, the control unit calculates the data transfer durations for a plurality of different possible link interface unit settings using formula 540 (of FIG. 5). It is noted that the control unit can be implemented using any suitable combination of hardware and/or software.

Then, the control unit inserts commands in the neural network application to change the power state of the link interface unit to achieve the optimal data transfer durations for each layer of the neural network during the backward pass (block 715). Next, the neural network application with the inserted commands is executed on the multi-GPU computing system to train the neural network (block 720). After block 720, method 700 ends.

Turning now to FIG. 8, one implementation of a method 800 for choosing optimal power combination settings for processing units training a neural network is shown. A control unit determines an amount of data to be transferred between processing units for a given layer of a neural network during a backward pass (block 805). The control unit calculates durations of the data transfer phase based on using different power state settings for a link interface (block 810). In one implementation, the power state settings include the link width and the clock frequency used to transfer data. The control unit also calculates durations of a compute phase for a compute module to execute the compute kernel of the given layer based on using different power settings (block 815). In various implementations, the durations of the compute phase are estimated and/or based on previously observed runtimes of the neural network. Then, the control unit calculates durations of an overlap of the data transfer phase and the compute phase based on using different permutations of the power state and power settings (block 820). For example, in one implementation, the control unit predicts the duration of tasks for a first power combination setting giving 10% of the available power to the compute module and 90% of the available power to the link interface, for a second power combination setting giving 20% of the available power to the compute module and 80% of the available power to the link interface, for a third power combination setting giving 30% of the available power to the compute module and 70% of the available power to the link interface, and so on.

Next, the control unit selects the power combination setting that results in a shortest duration for both the data transfer phase and the compute phase to complete for the given layer when overlapping the phases (block 825). Then, the control unit proactively causes the selected power combination setting to be applied to the link interface and the compute module during execution of the given layer (block 830). It is noted that as used herein, the term "proactive" is defined as changing a power combination setting prior to detecting a change in bandwidth on the link. After block 830, method 800 ends. It is noted that method 800 can be performed by each processing unit in the computing system. Alternatively, method 800 can be performed by a single processing unit, and then an indication of the selected power combination setting can be sent to the other processing units prior to the start of the given layer. By performing method 800, the total amount of time to complete the data transfer phase and the compute phase in an overlapped fashion is minimized.

Referring now to FIG. 9, one implementation of a method 900 for dynamically sharing power between components in a multi-GPU computing system performing neural network training is shown. A neural network training application is executed for a given number of epochs to identify a compute intensive phase and a memory intensive phase for each layer of the neural network (block 905). For the compute intensive phase of each layer, a control unit determines a first preferred link width and link clock frequency that does not violate the GPU power budget (block 910). For the memory intensive phase of each layer, the control unit determines a second preferred link width and link clock frequency that allows communication to complete before the compute kernel terminates (block 915). In one implementation, the goal of the second preferred link width and link clock frequency is to complete the data transfer in a power efficient fashion.

Then, during subsequent epochs of neural network training, the control unit determines the phase of the current neural network layer being executed (block 920). In one implementation, the control unit determines the phase of the current neural network layer being executed based on which compute kernel is being executed and/or which part of the compute kernel is being executed. If the phase of the current neural network layer being executed is a compute intensive phase (conditional block 925, "compute intensive phase" leg), then the control unit causes the link to operate at the first preferred link width and link clock frequency (block 930). Otherwise, if the phase of the current neural network layer being executed is a memory intensive phase (conditional block 925, "memory intensive phase" leg), then the control unit causes the link to operate at the second preferred link width and link clock frequency (block 935). After blocks 930 and 935, method 900 returns to block 920. It is noted that in another implementation, method 900 can be performed by a computing system that uses other types of processing units other than GPUs to train a neural network.

Figure 10:
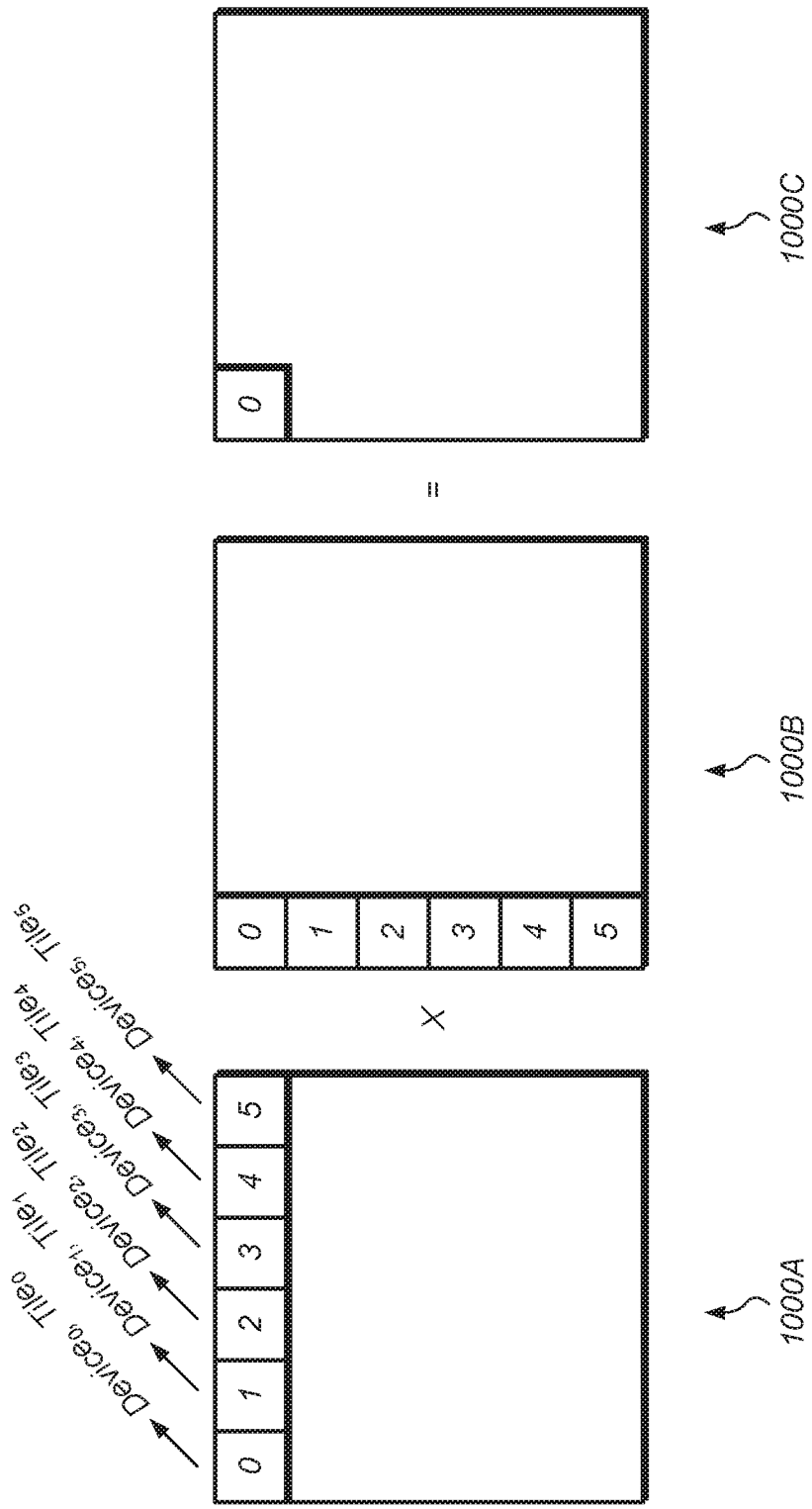
FIG. 10 is a block diagram representative of one implementation of a matrix multiplication application.

Turning now to FIG. 10, one implementation of a matrix multiplication application is shown. In one implementation, matrix 1000A is being multiplied by matrix 1000B to generate matrix 1000C. For matrix 1000A, tiles 0-5 are shown in the top row, with 6 tiles per row being shown only for illustrative purposes. For matrix 1000B, tiles 0-5 are shown for the leftmost column. Each tile can include any number of data elements, with the number of data elements varying according to the implementation. In one implementation, the matrix multiplication operation for matrices 1000A-B is performed by a plurality of processing units (e.g. GPUs). In this implementation, each processing unit requests a tile from matrix 1000A and a tile from matrix 1000B. A given processing unit will compute the product of a row of elements from a tile from matrix 1000A with a column of elements from a tile from matrix 1000B. This given processing unit will continue computing products until the entirety of the tile is processed. While the given processing unit is performing these computations locally, the given processing unit will simultaneously request data elements of other tiles from other processing units. This results in an overlap of communication with computation. Accordingly, the techniques described herein for choosing an optimal distribution of power during an overlap of communication with computation can be used for the processing units performing matrix multiplication operations. Other types of applications that have an overlap of communication with computation can benefit from these techniques.

Figure 11:
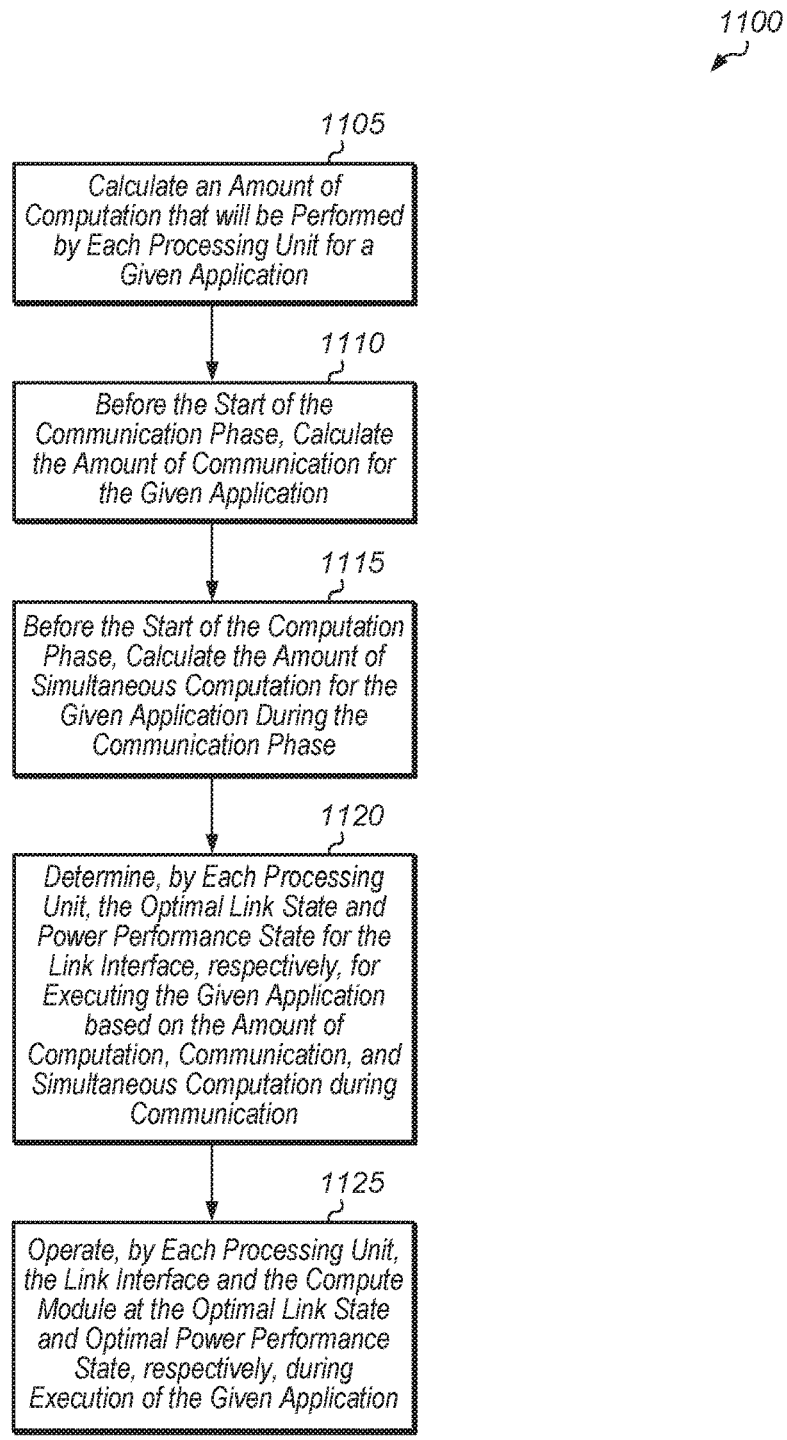
FIG. 11 is a generalized flow diagram illustrating one implementation of a method for executing, on a plurality of processing units, an application with an overlap of computation and communication.

Referring now to FIG. 11, one implementation of a method 1100 for executing, on a plurality of processing units, an application with an overlap of computation and communication is shown. An amount of computation that will be performed by each processing unit is calculated for a given application (block 1105). It is noted that block 1105 can be performed offline using a table or model, or block 1105 can be performed in real-time as the given application is running. Also, the amount of communication for the given application is calculated before the start of the communication phase (block 1110). Additionally, the amount of simultaneous computation for the given application during the communication phase is calculated before the start of the computation phase (block 1115). Next, each processing unit determines, based on the amount of computation, communication, and simultaneous computation during communication, the optimal link state and power performance state for the link interface and compute module, respectively, for executing the given application (block 1120). Then, during execution of the given application, each processing unit operates the link interface and the compute module at the optimal link state and optimal power performance state, respectively (block 1125). After block 1125, method 1100 ends. It is noted that method 1100 can be performed with any type of application that includes an overlap of computation and communication. These types of applications include, but are not limited to, neural network applications, matrix multiplication applications, and others.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form.

Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors that execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a plurality of processing units, wherein each processing unit of the plurality of processing units comprises:
        a compute module; and
        a configurable link interface configured to communicate data between a respective processing unit and one or more other processing units of the plurality of processing units; and
    a control unit comprising circuitry configured to:
        select, from a plurality of power combination settings, a first power combination setting for sharing power between the compute module and the configurable link interface of each processing unit, wherein the first power combination setting is selected based at least in part on an amount of data to transfer and a compute kernel execution time during a first period of time while executing a given software application; and
        cause, in a proactive manner, the compute module and the configurable link interface of each processing unit to operate with the first power combination setting during a period of overlap, within the first period of time, between a communication phase and a kernel computation phase while executing the given software application.

2. The system as recited in claim 1, wherein the control unit is further configured to:
    select a second power combination different from the first power combination setting based at least in part on an amount of data to transfer and compute kernel execution time during a second period of time while executing the given software application; and
    cause, in a proactive manner, the compute module and the configurable link interface of each processing unit to operate with the second power combination setting during overlap, within the second period of time, of the communication phase and the kernel computation phase while executing the given software application.

3. The system as recited in claim 1, wherein:
    each power combination setting specifies a given power setting for the compute module and a given power state for the configurable link interface of the plurality of processing units; and
    the given power state specifies a number of active lanes and a clock frequency for the configurable link interface.

4. The system as recited in claim 1, wherein the given software application is a neural network application, and wherein the first power combination setting is selected so as to allow a second neural network layer to begin at an earlier point in time compared to other power combination settings of the plurality of power combination settings.

5. The system as recited in claim 1, wherein the control unit is configured to generate a table with entries for different power combination settings.

6. The system as recited in claim 5, wherein the table includes estimates of an amount of time needed to complete data transfer for the plurality of power combination settings, and wherein the table includes estimates of an amount of time needed to complete kernel computation for the plurality of power combination settings.

7. The system as recited in claim 5, wherein the control unit is configured to generate a plurality of different tables for a plurality of layers of a neural network, wherein each table corresponds to a different layer of the neural network.

8. A method comprising:
    selecting, by a control unit comprising circuitry, a first power combination setting from a plurality of power combination settings for sharing power between a compute module and a configurable link interface, wherein the first power combination setting is selected based at least in part on an amount of data to transfer and a compute kernel execution time during a first period of time while executing a given software application; and
    causing, in a proactive manner, the compute module and the configurable link interface of each processing unit to operate with the first power combination setting during a period of overlap, within the first period of time, between a communication phase and a kernel computation phase while executing given software application.

9. The method as recited in claim 8, further comprising:
    selecting a second power combination different from the first power combination setting based at least in part on an amount of data to transfer and compute kernel execution time during a second period of time while executing the given software application; and
    causing, in a proactive manner, the compute module and the configurable link interface of each processing unit to operate with the second power combination setting during overlap, within the second period of time, of the communication phase and the kernel computation phase while executing the given software application.

10. The method as recited in claim 8, wherein:
    each power combination setting specifies a given power setting for the compute module and a given power state for the configurable link interface; and
    the given power state specifies a number of active lanes and a clock frequency for the configurable link interface.

11. The method as recited in claim 8, wherein the given software application is a neural network application, and wherein the first power combination setting is selected so as to allow a second neural network layer to begin at an earlier point in time compared to other power combination settings of the plurality of power combination settings.

12. The method as recited in claim 8, further comprising generating a table with entries for different power combination settings.

13. The method as recited in claim 12, wherein the table includes estimates of an amount of time needed to complete data transfer for the plurality of power combination settings, and wherein the table includes estimates of an amount of time needed to complete kernel computation for the plurality of power combination settings.

14. The method as recited in claim 12, further comprising generating a plurality of different tables for a plurality of layers of a neural network, wherein each table corresponds to a different layer of the neural network.

15. A processing unit comprising:
a compute module; and
a configurable link interface configured to communicate data between the processing unit and one or more other processing units;
wherein the processing unit is configured to:
select, from a plurality of power combination settings, a first power combination setting for sharing power between the compute module and the configurable link interface of each processing unit, wherein the first power combination setting is selected based at least in part on an amount of data to transfer and a compute kernel execution time during a first period of time while executing a given software application; and
cause, in a proactive manner, the compute module and the configurable link interface of each processing unit to operate with the first power combination setting during a period of overlap, within the first period of time, between a communication phase and a kernel computation phase while executing the given software application.

16. The processing unit as recited in claim 15, wherein the processing unit is further configured to:
select a second power combination different from the first power combination setting based at least in part on an amount of data to transfer and compute kernel execution time during a second period of time while executing the given software application; and
cause, in a proactive manner, the compute module and the configurable link interface of each processing unit to operate with the second power combination setting during overlap, within the second period of time, of the communication phase and the kernel computation phase while executing the given software application.

17. The processing unit as recited in claim 15, wherein:
each power combination setting specifies a given power setting for the compute module and a given power state for the configurable link interface; and
the given power state specifies a number of active lanes and a clock frequency for the configurable link interface.

18. The processing unit as recited in claim 15, wherein the given software application is a neural network application, and wherein the first power combination setting is selected so as to allow a second neural network layer to begin at an earlier point in time compared to other power combination settings of the plurality of power combination settings.

19. The processing unit as recited in claim 15, wherein the processing unit is configured to generate a table with entries for different power combination settings.

20. The processing unit as recited in claim 19, wherein the table includes estimates of an amount of time needed to complete data transfer for the plurality of power combination settings, and wherein the table includes estimates of an amount of time needed to complete kernel computation for the plurality of power combination settings.

* * * * *

UNITED STATES PATENT AND TRADEMARK OFFICE
CERTIFICATE OF CORRECTION

| | | |
|---|---|---|
| PATENT NO. | : 11,436,060 B2 | Page 1 of 1 |
| APPLICATION NO. | : 16/552065 | |
| DATED | : September 6, 2022 | |
| INVENTOR(S) | : Karthik Rao et al. | |

It is certified that error appears in the above-identified patent and that said Letters Patent is hereby corrected as shown below:

In the Claims

Column 14, Claim 8, Line 35, please delete "executing given software" and insert -- executing the given software --.

Signed and Sealed this
Twenty-seventh Day of December, 2022

Katherine Kelly Vidal
*Director of the United States Patent and Trademark Office*